US008339284B2

(12) United States Patent
He

(10) Patent No.: US 8,339,284 B2
(45) Date of Patent: Dec. 25, 2012

(54) METHOD AND APPARATUS FOR DISPLAYING FLIGHT PATH INFORMATION IN ROTOCRAFT

(75) Inventor: Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 1324 days.

(21) Appl. No.: 12/045,873

(22) Filed: Mar. 11, 2008

(65) Prior Publication Data

US 2009/0231163 A1  Sep. 17, 2009

(51) Int. Cl.
*G08B 21/00* (2006.01)
*G08G 5/00* (2006.01)
*G01C 21/00* (2006.01)

(52) U.S. Cl. ........ 340/946; 340/952; 340/959; 340/960; 340/971; 340/972; 340/973; 340/945

(58) Field of Classification Search .................. None
See application file for complete search history.

(56) References Cited

U.S. PATENT DOCUMENTS

| | | | |
|---|---|---|---|
| 5,016,177 A | 5/1991 | Lambregts | |
| 5,214,596 A | 5/1993 | Muller | |
| 5,289,185 A * | 2/1994 | Ramier et al. | 340/971 |
| 5,339,244 A | 8/1994 | Stiles, Jr. et al. | |
| 5,357,263 A | 10/1994 | Fischer et al. | |
| 5,420,582 A * | 5/1995 | Kubbat et al. | 340/974 |
| 5,553,812 A | 9/1996 | Gold et al. | |
| 5,838,262 A | 11/1998 | Kershner et al. | |
| 6,028,536 A * | 2/2000 | Voulgaris | 340/975 |
| 6,255,965 B1 | 7/2001 | D'Orso | |
| 6,320,579 B1 * | 11/2001 | Snyder et al. | 345/419 |
| 6,862,501 B2 * | 3/2005 | He | 701/3 |
| 6,931,368 B1 * | 8/2005 | Seifert | 703/8 |
| 6,933,859 B2 | 8/2005 | Hurt et al. | |
| 6,970,107 B2 * | 11/2005 | Gannett | 340/967 |
| 6,992,597 B2 | 1/2006 | Rogers et al. | |
| 6,995,690 B1 * | 2/2006 | Chen et al. | 340/974 |
| 7,091,881 B2 | 8/2006 | Judge et al. | |
| 7,106,217 B2 * | 9/2006 | Judge et al. | 340/973 |
| 7,477,985 B2 * | 1/2009 | Shirley et al. | 701/120 |
| 7,505,835 B2 * | 3/2009 | Brust et al. | 701/3 |
| 2003/0193411 A1 * | 10/2003 | Price | 340/973 |
| 2003/0222887 A1 * | 12/2003 | Wilkins et al. | 345/618 |

(Continued)

FOREIGN PATENT DOCUMENTS

EP  1972896 A2  9/2008

OTHER PUBLICATIONS

European search report for Application No. 09153139, mailed on Jun. 25, 2009.

*Primary Examiner* — Julie Lieu

(74) *Attorney, Agent, or Firm* — Ingrassia Fisher & Lorenz, P.C.

(57) ABSTRACT

A visual display system is provided, and includes a visual display element configured to display a visual display with three-dimensional, conformal background information at a first perspective; and a processor coupled to the visual display. The processor can be configured to evaluate flight path information and to adjust the visual display into a second perspective if the flight path information cannot be accurately displayed at the first perspective relative to the background.

20 Claims, 4 Drawing Sheets

U.S. PATENT DOCUMENTS

| | | | |
|---|---|---|---|
| 2005/0004721 A1 | 1/2005 | Einthoven et al. | |
| 2005/0182528 A1* | 8/2005 | Dwyer et al. | 701/3 |
| 2005/0206533 A1 | 9/2005 | Rogers et al. | |
| 2005/0237226 A1 | 10/2005 | Judge et al. | |
| 2006/0235581 A1 | 10/2006 | Petillon | |
| 2006/0238377 A1 | 10/2006 | Stiles et al. | |
| 2007/0002078 A1* | 1/2007 | He et al. | 345/633 |
| 2007/0005199 A1* | 1/2007 | He | 701/16 |
| 2007/0030174 A1 | 2/2007 | Randazzo et al. | |
| 2007/0032923 A1 | 2/2007 | Mossman et al. | |
| 2007/0085705 A1* | 4/2007 | He et al. | 340/967 |
| 2007/0188350 A1 | 8/2007 | He et al. | |
| 2007/0247336 A1* | 10/2007 | Morizet et al. | 340/945 |
| 2008/0169941 A1* | 7/2008 | He | 340/971 |
| 2008/0198157 A1* | 8/2008 | Feyereisen et al. | 345/419 |
| 2009/0319103 A1* | 12/2009 | Dwyer et al. | 701/14 |
| 2010/0250030 A1* | 9/2010 | Nichols et al. | 701/7 |
| 2010/0283637 A1* | 11/2010 | Franko et al. | 340/971 |
| 2011/0001636 A1* | 1/2011 | Hedrick | 340/971 |
| 2011/0208374 A1* | 8/2011 | Jayathirtha et al. | 701/5 |

* cited by examiner

METHOD AND APPARATUS FOR DISPLAYING FLIGHT PATH INFORMATION IN ROTOCRAFT

TECHNICAL FIELD

The present invention generally relates to display systems for aircraft, and more particularly relates to methods and apparatus for displaying flight path information on visual display systems in rotorcraft such as helicopters.

BACKGROUND

Modern aircraft contain visual display systems that provide pilots and/or flight crews with substantial amounts of important navigation, operational and situational awareness information, including information about the environment and terrain outside the aircraft. In fact, multi-functional aircraft displays can provide flight crews with computer-enhanced or generated, three-dimensional perspective images of terrain, e.g., especially during conditions of low visibility. These images can include three-dimensional background and terrain information as well as graphics that represent pitch reference lines, airspeed, flight path information, altitude, attitude, and the like. In some implementations, the terrain imagery of the background can be high resolution, computer-generated terrain image data derived from databases and onboard vision sensor systems.

The designers of display systems are continually attempting to provide more realistic and useful displays. One problem with many computer generated displays is that the visual perspective is relatively fixed. In other words, the direction and angle of the perspective displayed on the visual display is generally straight ahead, i.e., at a fixed angle to the aircraft that does not change. While this is acceptable for most flying conditions, it may cause issues in some situations in which navigation and flight information is desired to be displayed relative to the background or terrain information. Such situations include take-off and landing of a helicopter, when the direction of intended flight during take-off is generally almost straight up or down, i.e., at a steep ascent or decent angle. In such cases, the flight path information cannot typically be accurately displayed relative to the background on the limited dimensions of the display, which generally shows a straight ahead view. In this situation, such as display would only show a limited portion of ground information ahead of the helicopter. Essentially, the flight path is "off the screen" of the visual display relative to the background in this instance, and the visual display may provide merely general guidance of the flight plan or no flight path information at all.

Accordingly, it is desirable to provide improved visual display systems and methods. In addition, it is desirable to provide visual display systems and methods with synthetic, three dimensional background on which flight path information can be accurately displayed. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with one exemplary embodiment, a visual display system is provided, and includes a visual display element configured to display a visual display with three-dimensional, conformal background information at a first perspective; and a processor coupled to the visual display. The processor can be configured to evaluate flight path information and to adjust the visual display into a second perspective if the flight path information cannot be accurately displayed at the first perspective relative to the background.

In accordance with another exemplary embodiment, a method is provided for displaying a visual display in an aircraft. The method includes receiving flight path information; determining if the flight path information can be displayed in the visual display at a first perspective; and adjusting the visual display into a second perspective if the flight path information cannot be displayed in the visual display at the first perspective.

In accordance with yet another exemplary embodiment, a visual display system is provided for a rotorcraft. The system includes a navigation system configured to provide flight path information; a processor coupled to the navigation system and receiving the flight path information, the processor configured to provide display signals; and a visual display element coupled to the processor and configured to display a visual display based on display signals from the processor, the visual display including background information displayed at a perspective and a marker representing the flight path information, the perspective being adjusted to accommodate an accurate display of the marker relative to the background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide visual display systems and methods for aircraft, particularly for rotorcraft such as helicopters and tiltrotor aircraft. Exemplary embodiments particularly provide visual displays in which flight path information is more accurately displayed with respect to a three-dimensional background. This can be accomplished, for example, by adjusting the displayed perspective or point of view such that flight path information can be accurately displayed.

Figure 1:
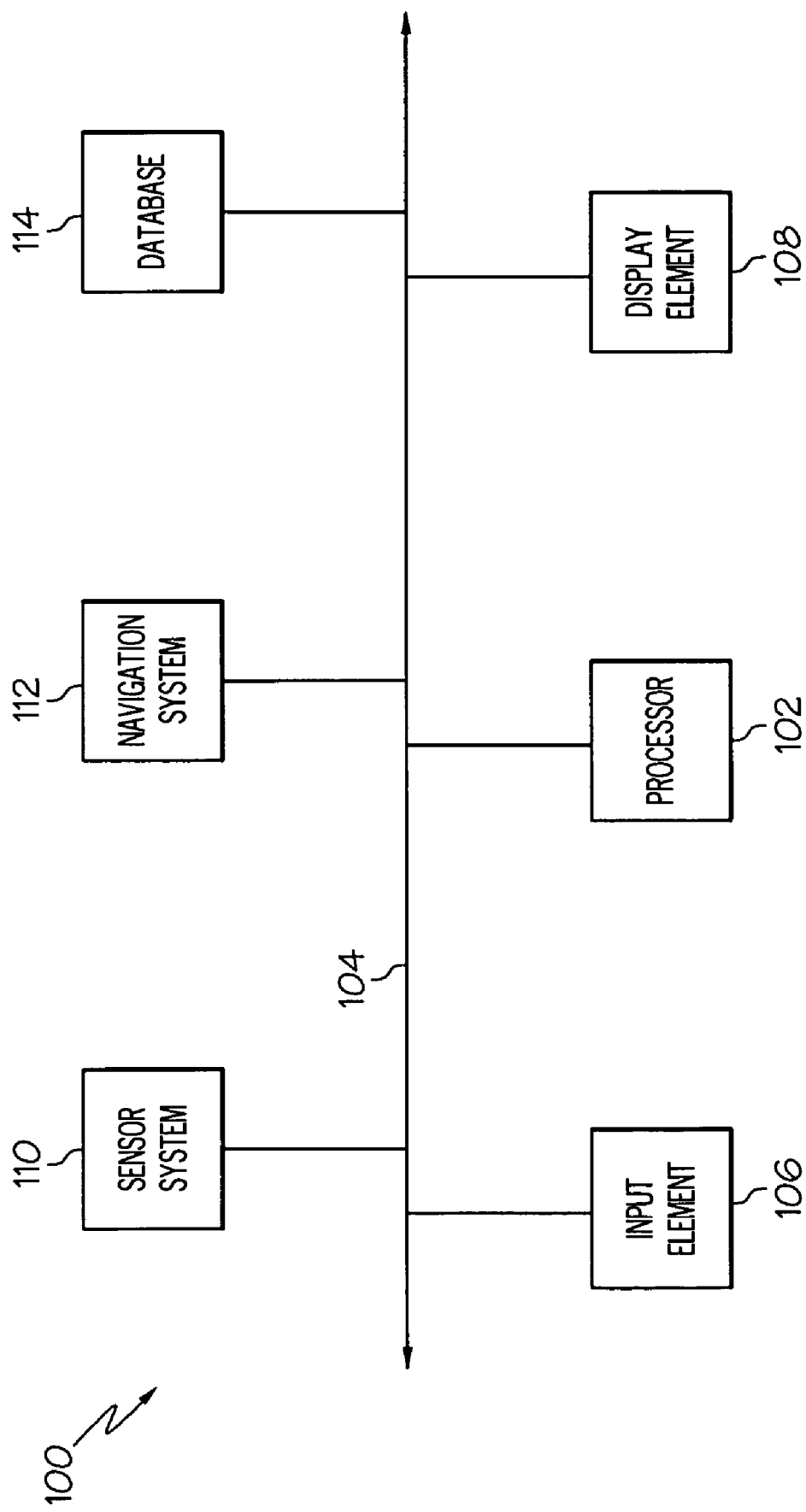
FIG. 1 is depicts a block diagram of a visual display system in accordance with an exemplary embodiment.

FIG. 1 depicts a block diagram of a visual display system 100 for an aircraft, such as a helicopter or other type of rotorcraft, in accordance with an exemplary embodiment. The system 100 includes a processor 102, a user input element 106, a visual display element 108, a sensor system 110, a navigation system 112, and a database 114, which are coupled to one another with a high speed data communications bus 104 or other connection scheme. The processor 102, user input element 106, display element 108, sensor system 110, navigation system 112, and database 114 can be individual components or integrated with one another, either onboard or external to the aircraft. Also, for example, system 100 can be arranged as an integrated system (e.g., aircraft display system, PFD system, etc.) or a subsystem of a more comprehensive aircraft system (e.g., Flight Management System, navigation and control system, target aiming and control system, collision alert and/or avoidance system, weather avoidance system, etc.). The various components of the system 100 will be generally described first and then followed by a more detailed explanation of their relationship to exemplary embodiments. Notably, the system 100 is suitable for implementing the method 200 described in more detail with reference to FIG. 2.

The processor 102 can be a computer processor such as, for example, a microprocessor, digital signal processor, or any suitable processor capable of at least receiving and/or retrieving aircraft status information, navigation and control information (e.g., from navigation system 112 and/or sensor system 110), and high resolution terrain information (e.g., from database 114 and sensor system 110), and also generating suitable display control signals for the display element 108. The display control signals can be used to generate a display with, for example, aircraft status information, navigation and control information (including, for example, a zero pitch reference line, heading indicators, tapes for airspeed and altitude, flight path information or similar type of aircraft aiming symbol, etc.), and three-dimensional terrain and other background information. As discussed in greater detail below, the processor 102 can include algorithms that can compare the current or intended flight path information to the background information at a particular perspective, and dynamically adjust the display signals such that the flight path information can be accurately displayed.

The database 114 can be a memory device (e.g., non-volatile memory, disk, drive, tape, optical storage device, mass storage device, etc.). The database 114 can include terrain and other background information stored as either absolute coordinate data or as a function of an aircraft's position. The database 114 can include, for example, the locations and elevations of natural terrain obstacles such as mountains or other elevated ground areas; the locations and elevations of man-made obstacles such as radio antenna towers, buildings, bridges, etc; boundaries and elevations of restricted airspace; and navigation data such as localized targets, runways, navigational waypoints, and position beacons.

The sensor system 110 can include one or more visual sensors and other types of sensors that provide information for the database 114 and/or processor 102. The information provided by the sensor system 110 can include navigation and control information, as well as background and terrain information.

The navigation system 112 can provide navigation data associated with the aircraft's current status, position and flight direction (e.g., heading, course, track, attitude, and any flight path information.) to the processor 102. The navigation system 112 can form part of a larger flight management system and can include, for example, an inertial navigation system, and a satellite navigation system (e.g., Global Positioning System). For one exemplary embodiment, the navigation system 112 can include suitable position and direction determination devices that are capable of providing the processor 102 with at least an aircraft's current position (e.g., in latitudinal and longitudinal form), the real-time direction (e.g., heading, course, track, etc.) of the aircraft in its flight path, and other important flight information (e.g., pitch, airspeed, altitude, attitude, etc.).

The display element 108 may include any device or apparatus suitable for displaying various types of computer-generated symbols and information representing, for example, natural and man-made terrain and other background information, pitch, heading, flight path, airspeed, altitude, attitude, target data, flight path marker data, and any type of flight path information in an integrated, multi-color or monochrome form (e.g., flat-panel color display). Although a cockpit display screen may be used to display the above-described flight information and terrain symbols and data, exemplary embodiments discussed herein are not intended to be so limited and can include any suitable type of display medium capable of visually presenting multi-colored or monochrome flight information and terrain symbols and data for a pilot or other flight crew member, and in particular, but not exclusively, on a continuous, three-dimensional perspective view aircraft display. As such, many known display monitors are suitable for displaying such information, symbols and data, such as, for example, various CRT and flat-panel display systems (e.g., CRT displays, LCDs, OLED displays, plasma displays, projection displays, HDDs, Heads-Up Displays/HUDs, etc.).

The user input element 106 includes, but is not limited to, keyboards, pointer devices, touch screens, microphones, etc. In some embodiments, the user input element 106 includes more than one type of input element. In other embodiments, the system 100 does not include any user input element 106, and/or the user input element 106 is only used to override automated functions of the system 100.

Figure 2:
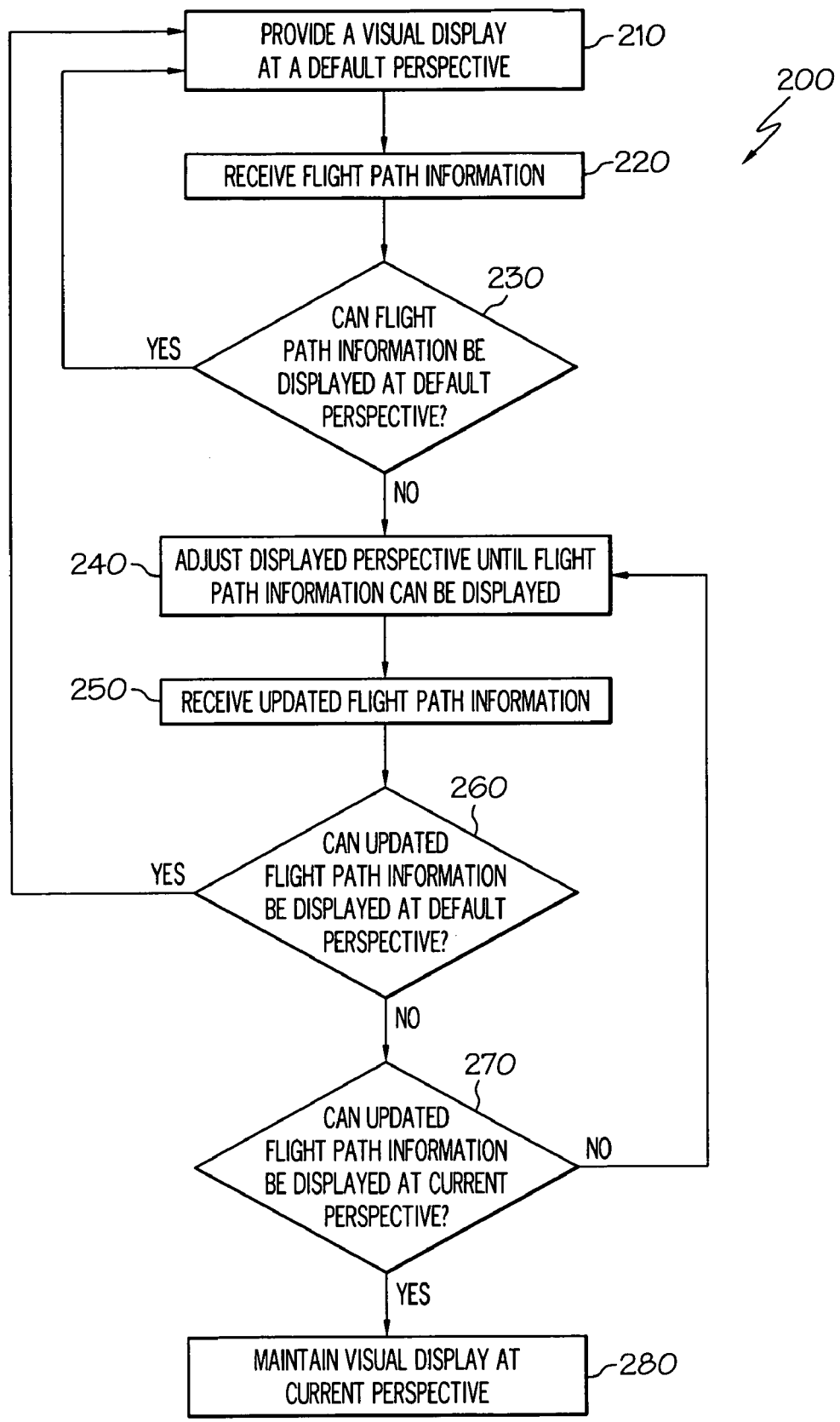
FIG. 2 depicts a flow chart showing a method of displaying flight path information in a visual display system in accordance with an exemplary embodiment.

FIG. 2 is a flow chart showing an exemplary method 200 of dynamically and more accurately displaying flight path information on a visual display. The method 200 can be implemented with, for example, the system 100 described above and will be described below in association with system 100.

Figure 3:
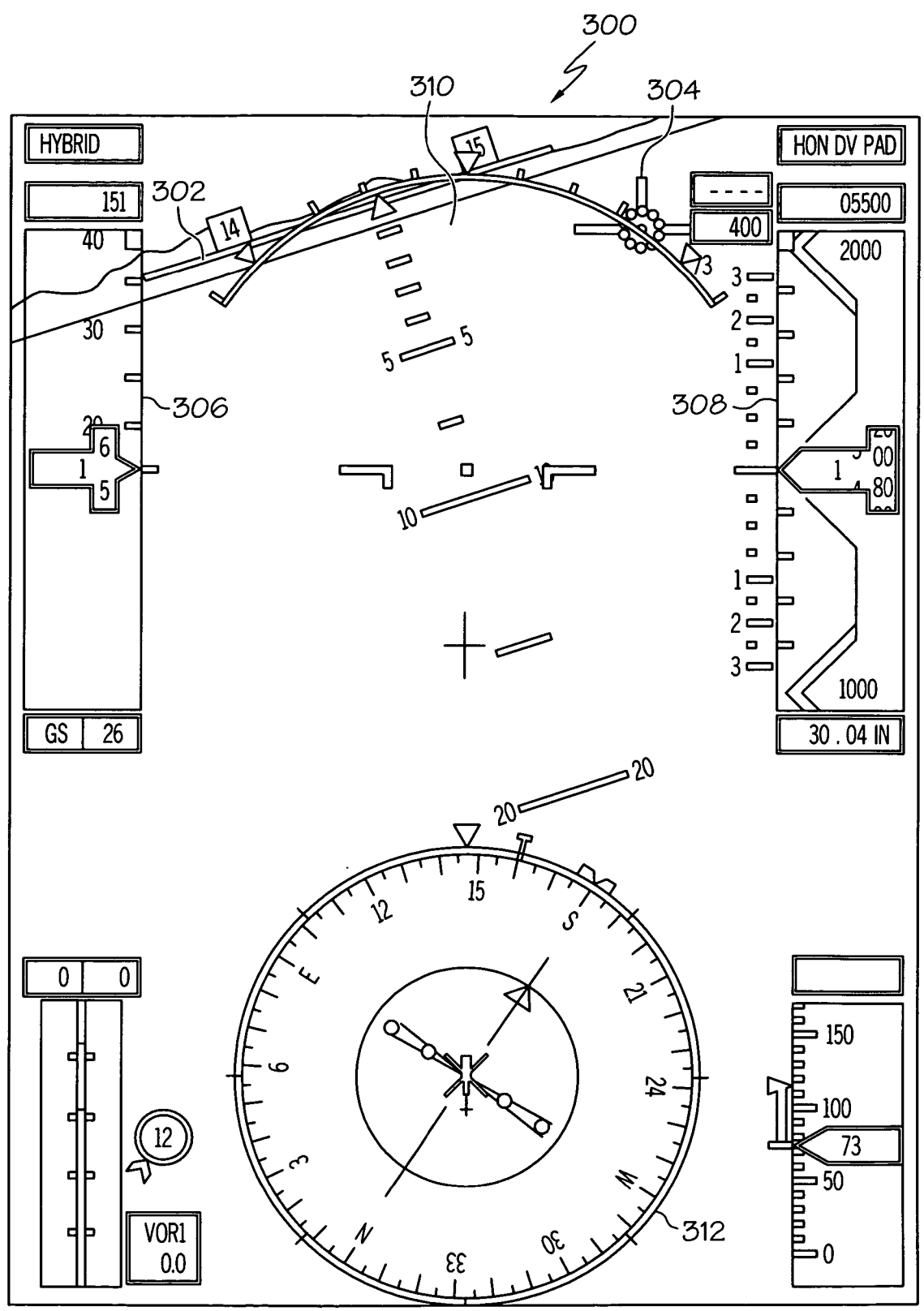
FIG. 3 is an exemplary visual display for a helicopter.

In step 210, a display system (e.g., system 100) produces a visual display, such as default display 300 shown in FIG. 3, which is also described in conjunction with the method 200 of FIG. 2. The default display 300 shows background 310 and, among other things, computer-generated symbols representing a zero pitch reference line 302, a flight path marker (also known as a flight path vector, or velocity vector) 304, an airspeed scale or tape 306, an altitude scale or tape 308, and a horizontal situational view 312. The background 310 typically includes the three-dimensional, synthetic or computer-generated terrain image data, including representations of the horizon and sky, that is derived from data provided by the database 114 and/or sensor system 110. In this example, the aircraft is a helicopter, or other type of rotorcraft, and is preparing to take off.

The default display 300 is a view from a default perspective (or "point of view"). The default perspective is typically the view of the pilot as he or she looks straight ahead and extends to a limited extent in the horizontal and vertical directions (i.e., the left, right, top, and bottom directions) from an origin or center of the display. For example, a typical avionics displays with proper terrain visual background for effective terrain awareness purposes may extend lateral and vertical fields of view of 40 degrees (+/−20 degrees) as measured from the center of the display. The default perspective can also be referred to as an "airframe perspective." The extent or relative distance from the origin within a particular perspective can be considered a deviation from the origin. The deviation in the longitudinal and vertical directions is typically a function of the size of the display and the scaling of the perspective. The perspective of a display primarily affects the background 310 since the background 310 attempts to re-create the real-world view of the pilot. When large scaling is used, i.e., large horizontal and vertical angles, it leads to diminished terrain feature size on a visual display thus reducing the effectiveness of terrain and situation awareness provided by such a display.

In step 220, the system 100 determines or receives flight path information for the current aircraft position. The flight path information can be flight path information for the current or intended flight path. The flight path information can be determined by the navigation system 112, or by user selected value via system 106, and can be information related to an intended flight path, target, or geometry. In step 230, the system 100 evaluates the flight path information relative to the default perspective. Particularly, the system 100 determines whether the flight path information can be displayed at the default perspective. This can be done, for example, by considering the angle relative to the horizon and direction relative to true north of the flight path information and comparing it to the deviation displayed in the current perspective. Here, when flight path angle is zero, the aircraft is moving parallel to the local earth surface. If the direction and angle of the flight path information relative to the background is greater than the deviation displayed in any direction, the flight path information cannot be accurately displayed relative to the background 310 in the perspective.

FIG. 3 is an example of this situation. In the example depicted by FIG. 3, the helicopter is taking off, and as such, the actual flight path is almost straight up. As such, the flight path information would be at too great an angle to be represented accurately on the limited dimensions of the display. In FIG. 3, the flight path information is represented by marker 304, which is not an accurate representation of the true flight path relative to the background 310. Flight path marker 304 provides a general guidance, but is not accurate, which is indicated to the pilot by its dashed/ghosted nature. This discrepancy can potentially cause confusion for the pilot, and at the very least, fails to provide useful flight path information.

Unlike the situation depicted in FIG. 3, if the flight path information can be accurately displayed at the default perspective, the method 200 will continue displaying at the default perspective, as shown in step 210. The method 200 will also continue to receive the flight path information and continue to evaluate the flight path information within the default perspective.

Figure 4:
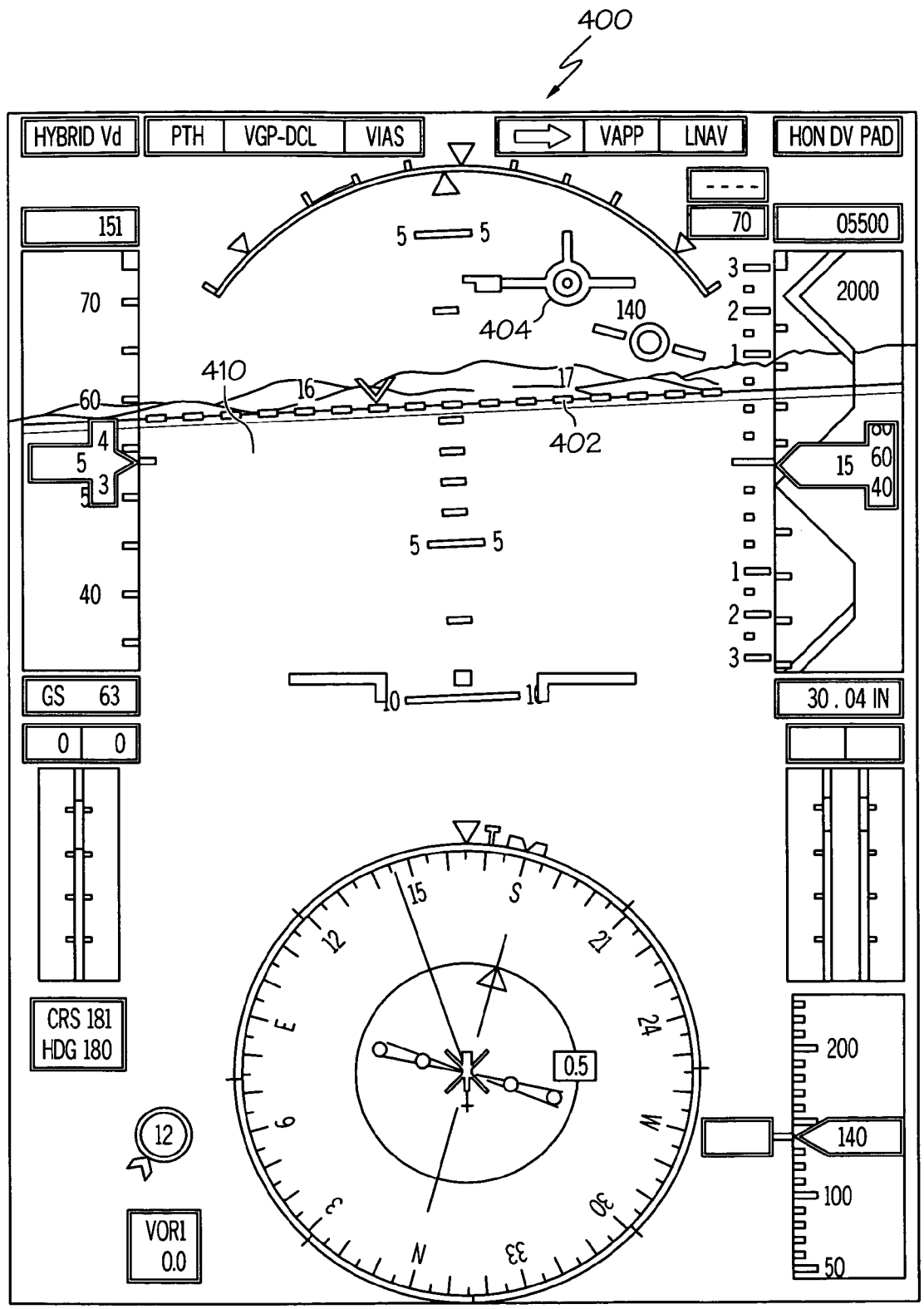
FIG. 4 is an exemplary visual display for a helicopter that has been adjusted relative to the display in FIG. 3.

If confronted with a situation like FIG. 3, the method 200 will proceed to step 240 in which the perspective is adjusted such that the flight path information can be accurately displayed. An adjusted display 400 is shown in FIG. 4. Particularly, by comparison with FIG. 3, it can be seen that the perspective, and as a result background 410, has been shifted up and to the right. As such, marker 404 can accurately indicate flight path information relative to the displayed background 410. Typically, this adjustment from the default display 300 of FIG. 3 to the adjusted display 400 of FIG. 4 is smoothly made so as not to disorient the pilot.

In step 240, the system 100 generally considers the angle and direction of the flight path information and ensures that the flight path marker 404 can be displayed relative to the background 410 within the viewing area of the display. The system 100 shifts the perspective in one or more of the horizontal and/or vertical directions to accommodate the angle and direction. This provides the flight crew with an accurate representation of the actual flight path information relative to the background 410. In an intuitive sense, this adjustment represents the action of a pilot turning his or her head to get a better view of the intended flight direction out of a window of a helicopter. The display mimics this perspective with the three-dimensional, conformal background 410 and the flight path information. The adjusted perspective can be indicated by the dashed nature of a zero pitch reference line 402 or size, position, and color change of the aircraft symbol on the display. Certain textual annunciations or indications may also be provided. In other embodiments, the display can be adjusted by increasing or decreasing the scaling of the perspective. In other words, the system 100 can "zoom out" such that the flight path information can be accurately displayed relative to the background 410. In an alternate exemplary embodiment, the perspective can be adjusted manually by the flight crew with, for example, the user input element 106.

After the perspective has been adjusted in step 240, the system 100 receives updated flight path information in step 250 and determines whether the updated flight path information can be displayed at the default perspective in step 260. If so, the method 200 proceeds back to step 210 and the visual display returns to the default perspective. If the updated flight path information cannot be displayed at the default perspective, the method 200 evaluates in step 270 whether the flight path information can be displayed at the current perspective. If so, the method 200 proceeds to step 280 and the visual display maintains the current perspective. If not, the method 200 in step 240 again adjusts the perspective such that the flight path information can accurately be displayed relative to the background.

As noted above, the method 200 can be particularly useful for displaying accurate flight path information during certain phases of flight, such as for example, take-off and landing, as well as excessive attitude maneuvers. The flight path information can include current or intend flight path information and/or can include user-selected flight path information. It should also be understood that exemplary methods may include additional or fewer steps or may be performed in the context of a larger processing scheme. For example, in an alternate embodiment, step 210 of method 200 can be omitted and an adjusted display such as the adjusted display 400 as shown in FIG. 4 can be displayed without first displaying a default perspective. Additionally, steps 260 and/or 270 can be omitted. Furthermore, it will be understood by one of skill in the art that although the specific embodiments illustrated below are directed at helicopters for purposes of explanation, the methods and apparatus may be used in various embodiments employing various types of displays, such as displays in space craft, aircraft, rotorcraft, and unmanned air vehicles (UAV). Moreover, embodiments of the present invention are suitable for use on CRT, LCD, plasma displays or any other existing or later developed display technology.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:
1. A visual display system, comprising:
 a visual display element configured to display a visual display with three-dimensional, conformal background information at a first perspective; and a processor coupled to the visual display and configured to evaluate flight path information and to adjust the visual display into a second perspective if the flight path information cannot be accurately displayed at the first perspective relative to the background, wherein the flight path information is information related to a flight path angle, a flight path direction, or user-selected flight path information.

2. The visual display system of claim 1, wherein the visual display element is configured to accurately display the flight path information relative to the background at the second perspective.

3. The visual display system of claim 1, wherein the visual display element initially displays the visual display at the first perspective and then displays the visual display at the second perspective based on adjustments from the processor, wherein the visual display element is configured to display a perspective indication that indicates when the visual display element is displaying the second perspective instead of the first perspective, wherein the perspective indication is at least one of a modified pitch reference line, a modified aircraft symbol, or a text annunciation.

4. The visual display system of claim 1, wherein the processor is configured to adjust the visual display into the second perspective during at least one of a take-off condition and a landing condition.

5. The visual display system of claim 1, wherein the processor is configured to monitor the flight path information and adjust the visual display into a third perspective if the flight path information cannot be displayed at the second perspective.

6. The visual display system of claim 1, wherein the processor is configured to return the visual display to the first perspective when the flight path information can be displayed at the first perspective.

7. The visual display system of claim 1, wherein the flight path information is a flight path at too great an angle relative to the background to be displayed at the first perspective.

8. The visual display system of claim 1, wherein the processor is configured to adjust the perspective by adjusting the perspective in a lateral and/or vertical direction.

9. The visual display system of claim 1, wherein the processor is configured to adjust the perspective by zooming the perspective in or out.

10. The visual display system of claim 1, wherein the processor is configured to adjust the visual display into the second perspective during an excessive attitude maneuver.

11. The visual display system of claim 1, wherein the visual display element is a primary flight display (PFD).

12. The visual display system of claim 1, wherein the first perspective is an airframe perspective and the second perspective is a flight path perspective, and wherein the processor is configured to select between the airframe perspective and the flight path perspective for display on the visual display element based on at least one of flight path angle or flight path direction.

13. A visual display system, comprising:
a visual display element configured to display a visual display with three-dimensional, conformal background information at a first perspective; and
a processor coupled to the visual display and configured to evaluate flight path information and to adjust the visual display into a second perspective if the flight path information cannot be accurately displayed at the first perspective relative to the background,
wherein the visual display element is a rotorcraft visual display element.

14. The visual display system of claim 13, wherein the flight path information is one of current and intended flight path information.

15. The visual display system of claim 13, wherein the visual display element is configured to accurately display the flight path information relative to the background at the second perspective.

16. A method for displaying a visual display in an aircraft, comprising:
receiving flight path information;
determining if the flight path information can be displayed in the visual display at a first perspective;
adjusting the visual display into a second perspective if the flight path information cannot be displayed in the visual display at the first perspective, wherein the determining step includes evaluating at least one of the flight path angle and the flight path direction; and
receiving updated flight path information and adjusting the visual display into the first perspective if the updated flight path information can be displayed in the visual display at the first perspective.

17. The method of claim 16, wherein the first perspective has a deviation within the visual display, and wherein the evaluating step includes comparing the at least one of the flight path angle and the flight path direction to the deviation.

18. The visual display system of claim 13, wherein the visual display element initially displays the visual display at the first perspective and then displays the visual display at the second perspective based on adjustments from the processor, wherein the visual display element is configured to display a perspective indication that indicates when the visual display element is displaying the second perspective instead of the first perspective, wherein the perspective indication is at least one of a modified pitch reference line, a modified aircraft symbol, or a text annunciation.

19. The visual display system of claim 13, wherein the processor is configured to adjust the visual display into the second perspective during at least one of a take-off condition and a landing condition.

20. The visual display system of claim 13, wherein the processor is configured to monitor the flight path information and adjust the visual display into a third perspective if the flight path information cannot be displayed at the second perspective.

* * * * *